Patented June 1, 1943

2,320,479

UNITED STATES PATENT OFFICE 2,320,479

TOPICAL REMEDY

George Sperti, Cincinnati, Ohio, assignor to The Institutum Divi Thomae Foundation, Cincinnati, Ohio, a corporation of Ohio No Drawing. Application June 19, 1939, Serial No. 279,999

12 Claims. (Cl. 167—58)

This invention relates to topical remedies such as salves, ointments, unguents, wet dressings, etc., for topical application in the case of cuts, burns, sores, skin eruptions and disorders, and similar troubles. This application is a continuation in part of my prior application Serial No. 184,339 filed January 10, 1938.

For purposes of illustration, the invention may be described with reference to the treatment of burns, although it will be understood that it is not limited to such use. The usual treatment of burns is characterized by such measures as the exclusion of external air, which prevents the normal respiration of epithelial tissue by absorption of oxygen from the air, and by the use to prevent infection of germicidal agents and astringents which depress the respiration or oxygen consumption of the tissue with the result that healing is retarded and the burn heals slowly with the formation of scar tissue rather than normal skin. Depression of respiration of the tissue is characteristic of topical remedies, particularly of those remedies containing antiseptics or germicides, whereas it is obviously desirable that proliferation and healing proceed under conditions of normal metabolism. Therefore it is desirable to compensate for the well-known depressing action of such topical remedies. This can be accomplished by the addition to such remedial agents of respiratory stimulating agents as disclosed in my copending application Serial No. 280,000, filed June 19, 1939.

In remedies intended for the promotion of wound healing, it is also desirable to stimulate the cellular proliferation or growth of the injured tissue. Certain proliferation stimulants are known as, for example, allantoin and alpha thio-glycerol, and in some instances these known proliferants can be employed in combination with respiratory stimulating factors. Preferably, however, use is made of a proliferation-promoting factor obtained from fish livers or from other animal tissues such as spleen.

The following examples are illustrative of suitable methods for preparing respiratory stimulating factors, but as the method of preparation is not part of the present invention it will be understood that these examples are not to be construed as defining the limits of the invention and that any suitable respiratory stimulating factor can be employed.

Example 1

Yeast is a convenient source of material which can readily be processed and which provides a substantial yield of the respiratory stimulating substances. The following procedure may be followed for producing the crude preparation.

Seven pounds of fresh Fleischmann's baker's yeast were extracted with 2.5 liters of 95% ethyl alcohol for four hours at a temperature of 60–70° C. with constant mechanical stirring. The alcohol lost during the extraction was continually replaced. The mixture was then filtered through a Büchner funnel and the residue reextracted with 2.5 liters of 50% ethyl alcohol under the same conditions. The extracts were filtered until clear and the residues discarded. The combined filtrates contained a crude respiratory stimulating substance which was obtained in solid form by evaporating the combined filtrates to 400 cc. under reduced pressure at a temperature not greater than 60° C. and then evaporating the extract to dryness at 70° C. This crude substance when tested for its capacity to stimulate cellular respiration according to the manometric methods showed stimulation with respect to both rat skin and human skin.

The crude extract described above is suitable for use in some cases, as in soap, but may have an objectionable odor or color when used in other preparations such as face creams, mouth washes, etc. For such purposes it is therefore desirable to refine the crude extract. This extract is substantially free of protein but contains small amounts of certain dissolved protein substances which it is first desirable to remove. This may readily be accomplished by precipitation with a suitable precipitating agent, barium hydroxide being well suited because excess barium can readily be removed. The following procedure is illustrative: To 200 cc. of the extract were slowly added with constant stirring 800 cc. of a hot saturated solution of barium hydroxide. A volume of 95% ethyl alcohol, equal to twice the volume of the extract plus the barium hydroxide, was then added with constant stirring which was continued for ten minutes after the addition had been completed. The mixture was allowed to stand for ten minutes longer and filtered. To remove excess barium, the filtrate was saturated with carbon dioxide by bubbling it through the liquid for one hour, after which the mixture was concentrated under reduced pressure to a volume of 150 cc. at 30–55° C. and was filtered through a Büchner funnel to remove the barium carbonate precipitate. The filtrate was then warmed to 60° C. on a water bath and 2.5 N. sulphuric acid was added slowly with constant stirring until all the barium was precipitated, 22 cc. of acid being required. The barium sulphate was filtered out, leaving a perfectly clear filtrate which was evaporated to dryness at 70° C. This material showed definite stimulation of respiration on skin of the order of 40-65%.

For further refinement of the filtrate described immediately above, this filtrate was treated with acetone by adding three liters of acetone slowly, with shaking, to 150 cc. thereof, allowing the mixture to stand at room temperature for 72 hours, after which the acetone solution was decanted from the red oily precipitate. This precipitate, after washing with acetone and drying at 70° C. showed marked stimulation on skin.

A similar product was also obtained from the precipitate from the orginal barium hydroxide precipitation. To remove the water soluble constituents, this precipitate was stirred with a 100 cc. portion of distilled water at room temperature and filtered. After this operation had been repeated three times, the combined washings were saturated with carbon dioxide, the solution reduced in vacuum at 40° C. to a volume of 54 cc., and the barium carbonate filtered off and discarded. The clear, reddish filtrate was then heated to 60° C. and 2 cc. of 2.5 N. sulphuric acid were slowly added with stirring, after which the barium sulphate formed was allowed to settle and filtered off. The solution was evaporated to dryness at 70° C. and the resulting product showed definite stimulation of skin respiration.

Example 2

A simpler method of refining the crude alcoholic yeast extract described in the foregoing example is by the use of an adsorbent such as charcoal, diatomaceous earth, etc., as a refining agent. The above described method of extracting Fleischmann's baker's yeast with 95% ethyl alcohol and then with 50% ethyl alcohol and then combining and concentrating the extracts may be followed to obtain the crude extract. The following procedure illustrates the refinement of this crude extract by means of activated charcoal.

The concentrate was divided into three portions and dried in the oven at 50-55° C. The dry material was dissolved in distilled water (Sample A), 25 per cent ethyl alcohol (Sample B) and 40 per cent ethyl alcohol (Sample C) to a concentration of approximately 50 mg./cc. The three solutions were then further divided into 3 parts to decolorize at 5-8° C. (Sample 1), room temperature, which was about 25° C. (Sample 2), and 60° C. (Sample 3). The solution was either heated or cooled to the proper temperature and approximately one-tenth its weight of charcoal added. After stirring well for a few minutes, the material was filtered through a Büchner funnel. The charcoal was then removed from the filter, stirred in the same solvent at the same temperature as the previous treatment, and again filtered to remove adhering material, and the washings were added to the original filtrate.

The original crude, after drying and making up to the proper concentration with the various solvents, was dark brown in color and had an objectionable yeast-like odor. After treatment with the charcoal, in every case, the color became lighter and the odor less disagreeable. The water decolorizations were more effective in removing the color and odor than the alcoholic ones, and the 5-8° C. and 60° C. treatments were better than the room temperature decolorizations. Two or three successive treatments of this water solution at 60° C. gave water-white and nearly odorless preparations.

For testing the dried samples were made up to a concentration of 50 mg. per cc. or, if the quantity of material was small, as in the case of the charcoal adsorbed material, as high a concentration as possible was used. The pH was determined by the glass electrode and adjusted to 7.3 with sodium hydroxide or hydrochloric acid for testing on yeast and skin respiration. If the pH of the samples was between 5.6 and 7.3 they were sterilized at 15 pounds pressure for 15 minutes before adjusting the pH. It had been found earlier that the respiratory stimulating factors may be sterilized within this pH range without loss of activity. Samples, the initial pH of which lay outside the above range, were adjusted to pH 7.3 before sterilization.

The decolorized filtrates were tested on skin by the manometric method referred to above. While all of the samples showed stimulation of skin respiration, those giving the best results were as follows:

| Sample | Original pH | Original conc., mg./cc. | Skin activity | |
|---|---|---|---|---|
| | | | Per cent stimulation | Conc., mg./cc. at pH 7.3 |
| A-3-a | 6.6 | 50.0 | 110 | 7.26 |
| | | | 106 | 10.0 |
| B-1-a | 5.95 | 50.0 | 52 | 6.67 |
| | | | 47 | 10.0 |
| C-1-a | 5.95 | 50.0 | 41 | 10.0 |

Example 3

Ten pounds of fresh beef spleens were skinned, cut into small pieces and washed with cold water to remove blood. The pieces were ground in a meat grinder and extracted with 4 liters of distilled water for 1 hour at 45° C. with constant mechanical stirring. The material was filtered through cheesecloth and muslin and squeezed as dry as possible. To 3 liters of this filtrate was added 12 liters of 95% ethyl alcohol to give a final alcohol concentration of 80%. This caused the formation of a precipitate which was filtered off on a Büchner funnel and was then extracted with 1.5 liters of water. The material was then filtered on a Büchner funnel and the filtrate was concentrated to small volume in vacuo at not greater than 65° C. and brought to dryness in an oven at 50° C. In manometer tests this material showed stimulation of skin respiration of 42%.

The crude alcoholic extract from yeast described above in Example 1 contains not only a respiratory stimulating factor but also a growth-promoting factor which can be separated by steam distillation as disclosed in the copending application of Cook and Kreke, Serial No. 193,607, filed March 2, 1938. Hence when using the crude yeast extract as a source of respiratory stimulating factors, a proliferation-stimulating effect is also obtained.

Separate proliferation stimulants are preferably used, however, and as stated above it is preferred to employ a proliferation-promoting factor which is obtained from fish or animal livers or other animal tissue such as spleen. It has been found that these factors are present, along with vitamin A or D which appear to be inactive, in the concentrated fat-soluble, non-saponifiable fraction of fish liver oils and hence these may be used as a source of the growth promoting factor. However, these factors in purer form can be produced by suitable treatment of such animal tissue, as illustrated by the following examples:

Example 4

The residue from the first extraction of beef spleen as described above in Example 3 was extracted with 1.5 liters of ether for three days, after which the ether was removed leaving an oil. This oil contains a growth-promoting factor and can be used in topical remedies for the above purposes.

Example 5

The alcoholic precipitate from beef spleen as described above in Example 3, was extracted with 1.5 liters of ether for several days, filtered from the residue, and the ether removed to yield a fat-soluble fraction which also contains a growth-promoting factor suitable for use as described above.

The respiratory stimulating factor, and the proliferation-promoting factor as well, can be incorporated in topical remedies in any suitable manner. The respiratory stimulating factor is readily taken up by lanolin, which is a conventional ingredient of salves and the like in admixture with petroleum jelly. In the case of wet dressings and other preparations which consist chiefly of germicidal substances in aqueous solution, the respiratory stimulating factors may be dissolved directly in the aqueous medium. In preparations less viscous than salves with a petroleum jelly base, the respiratory stimulating factor may be held in suspension in the oil by emulsification. The growth promoting factor from animal tissue can be added directly to preparations of any of the above types.

The amount of respiratory stimulating factor to be added is preferably approximately the amount required to compensate for the depressing action, which varies depending on the characteristics of each particular preparation such as the nature and concentration of the germicide or antiseptic. Similarly the amount of proliferation stimulant, where used, may vary within substantial limits depending on the intended use of the preparation and the effect that is desired. It will be understood that these remedies may also include any of the conventional ingredients, such as an anaesthetic agent, deodorants, coloring agents, perfumes, etc. Where anaesthetics are included, however, the amount of respiratory stimulating factor should be correspondingly increased because anaesthetics cause marked depression of tissue respiration.

The following example illustrates a suitable composition for a salve containing growth-promoting factor in the form of fish liver oil concentrate and also respiratory stimulating factor (R. S. F.):

| | | |
|---|---|---|
| Growth factor | grams | 210 |
| Merphenyl nitrate | do | 1.75 |
| Corn oil | do | 350 |
| Oil of thyme | cc | 7 |
| Petrolatum | grams | 6,410 |
| R. S. F | do | 70 |

This mixture makes 15 lb. of salve. The petrolatum was heated to the melting point. The merphenyl nitrate was ground into the corn oil, in a mortar, and the solution added to the petrolatum. The growth factor and the oil of thyme were then added by stirring. The R. S. F., incorporated in a small amount of lanolin, was then added and the mixture poured into jars. The 1.75 grams merphenyl nitrate gave the mixture a concentration of 1:4,000 of bactericide. This concentration is recommended when the wounds to be treated are infected or there is danger of infection. For clean wounds and wounds easily kept sterile a concentration of 1:20,000 of bactericide is recommended.

While, for most purposes, the proliferation stimulating agent is preferably used in combination with the respiratory stimulating agent, it has been found that good results are obtained in some cases without the respiratory stimulating agent when the proliferation stimulant is of the type obtained from animal tissue as described above. These factors are produced as the result of injury to the tissue cells, being given off by the cells as natural products and extracted as above indicated. Such factors have been found to be superior to artificially produced agents such as alantoin and alpha thioglycerol and are particularly advantageous in topical remedies either with or without respiratory stimulating agents. Hence it will be understood that in the typical formula given above, the R. S. F. may in some cases be omitted.

Salve having the composition above described has been used in the treatment of various skin troubles, such as athlete's foot, psoriasis, etc., and of burns, cuts, wounds, etc. When applied to the treatment of burns, it is found that there is rapid healing accomplished by the growth of new skin rather than scar tissue. It appears that the growth-promoting properties of this salve stimulate the normal growth processes of the epithelial cells which results in rapid proliferation and normal growth of epithelial tissue. When applied to the treatment of skin infections such as athlete's foot and the like, it is desirable to make successive applications of a suitable germicidal agent and of the salve in order to obtain the best results. The salve also has a marked analgesic action.

It will be apparent that the invention is not restricted to any particular type or form of topical remedy, or as to the source or mode of preparation of the stimulating factors, or as to the proportions and nature of the other ingredients of the remedy, as many variations thereof will now suggest themselves to those skilled in the art without departure from the spirit of the invention. Hence reference should be had to the appended claims for a definition of the limits of the invention.

What is claimed is:

1. A topical remedy of the type which causes depression of cellular respiration in the tissue to which it is applied, said remedy containing a respiratory stimulating agent capable of stimulating cellular respiration of said tissue as determined by manometric measurement, thereby compensating at least in part for said depressing effect.

2. A topical remedy of the type which causes depression of cellular respiration in the tissue to which it is applied, said remedy containing a proliferation stimulating agent and a respiratory stimulating agent capable of stimulating cellular respiration of said tissue as determined by manometric measurement, thereby compensating at least in part for said depressing effect.

3. A topical remedy of the type which causes depression of cellular respiration in the tissue to which it is applied, said remedy containing a respiratory stimulating agent capable of stimulating cellular respiration of said tissue as determined by manometric measurement and a proliferation stimulating agent capable of stimulating cellular proliferation of said tissue, said proliferation stimulating agent comprising the concentrated fat-soluble portion of cells.

4. A topical remedy of the type which causes depression of cellular respiration in the tissue to which it is applied, said remedy containing a respiratory stimulating agent capable of stimulating cellular respiration of said tissue as determined by manometric measurement and a proliferation stimulating agent capable of stimulating cellular proliferation of said tissue, said proliferation stimulating agent comprising the concentrated fat-soluble portion of spleen cells.

5. A topical remedy of the type which causes depression of cellular respiration in the tissue to which it is applied, said remedy containing a respiratory stimulating agent capable of stimulating cellular respiration of said tissue as determined by manometric measurement and a proliferation stimulating agent capable of stimulating cellular proliferation of said tissue, said proliferation stimulating agent comprising the concentrated fat-soluble portion of liver cells.

6. A topical remedy of the type which causes depression of cellular respiration in the tissue to which it is applied and containing a respiratory stimulating agent capable of stimulating cellular respiration of said tissue as determined by manometric measurement, thereby compensating at least in part for said depressing effect, said respiratory stimulating agent comprising the concentrated water-soluble constituents of cellular matter.

7. A topical remedy of the type which causes depression of cellular respiration in the tissue to which it is applied and containing a respiratory stimulating agent capable of stimulating cellular respiration of said tissue as determined by manometric measurement, thereby compensating at least in part for said depressing effect, said respiratory stimulating agent comprising the concentrated water-soluble constituents of yeast cells.

8. A topical remedy of the type which causes depression of cellular respiration in the tissue to which it is applied and containing a respiratory stimulating agent capable of stimulating cellular respiration of said tissue as determined by manometric measurement, thereby compensating at least in part for said depressing effect, said respiratory stimulating agent comprising the acetone-insoluble portion of the water-soluble constituents of yeast cells.

9. A topical remedy of the type which causes depression of cellular respiration in the tissue to which it is applied and containing a proliferation stimulating agent and a respiratory stimulating agent capable of stimulating cellular respiration of said tissue as determined by manometric measurement, thereby compensating at least in part for said depressing effect, said respiratory stimulating agent comprising the concentrated water-soluble constituents of cellular matter.

10. A topical remedy of the type which causes depression of cellular respiration in the tissue to which it is applied and containing a proliferation stimulating agent and a respiratory stimulating agent capable of stimulating cellular respiration of said tissue as determined by manometric measurement, thereby compensating at least in part for said depressing effect, said respiratory stimulating agent comprising the concentrated water-soluble constituents of yeast cells.

11. A topical remedy of the type which causes depression of cellular respiration in the tissue to which it is applied and containing a proliferation stimulating agent and a respiratory stimulating agent capable of stimulating cellular respiration of said tissue as determined by manometric measurement, thereby compensating at least in part for said depressing effect, said respiratory stimulating agent comprising the acetone-insoluble portion of the water-soluble constituents of yeast cells.

12. A topical remedy of the type which causes depression of cellular respiration in the tissue to which it is applied and containing a proliferation stimulating agent and a respiratory stimulating agent capable of stimulating cellular respiration of said tissue as determined by manometric measurement, thereby compensating at least in part for said depressing effect, said respiratory stimulating agent comprising the concentrated water-soluble constituents of yeast cells and said proliferation stimulating agent comprising the concentrated fat-soluble constituents of fish livers.

GEORGE SPERTI.